June 23, 1959 A. E. JOHNSON ET AL 2,892,040

ELECTRICAL RECORDING AND REPRODUCING APPARATUS

Filed Sept. 9, 1954

INVENTORS
ALBERT ERNEST JOHNSON
THEODORE DAVID CONWAY
BY Frederick L. Haug
ATTORNEY

United States Patent Office 2,892,040

Patented June 23, 1959

2,892,040

ELECTRICAL RECORDING AND REPRODUCING APPARATUS

Albert Ernest Johnson, North Weald, and Theodore David Conway, Hampstead, London, England Application September 9, 1954, Serial No. 454,962

7 Claims. (Cl. 179—100.2)

Figures 1, 2:
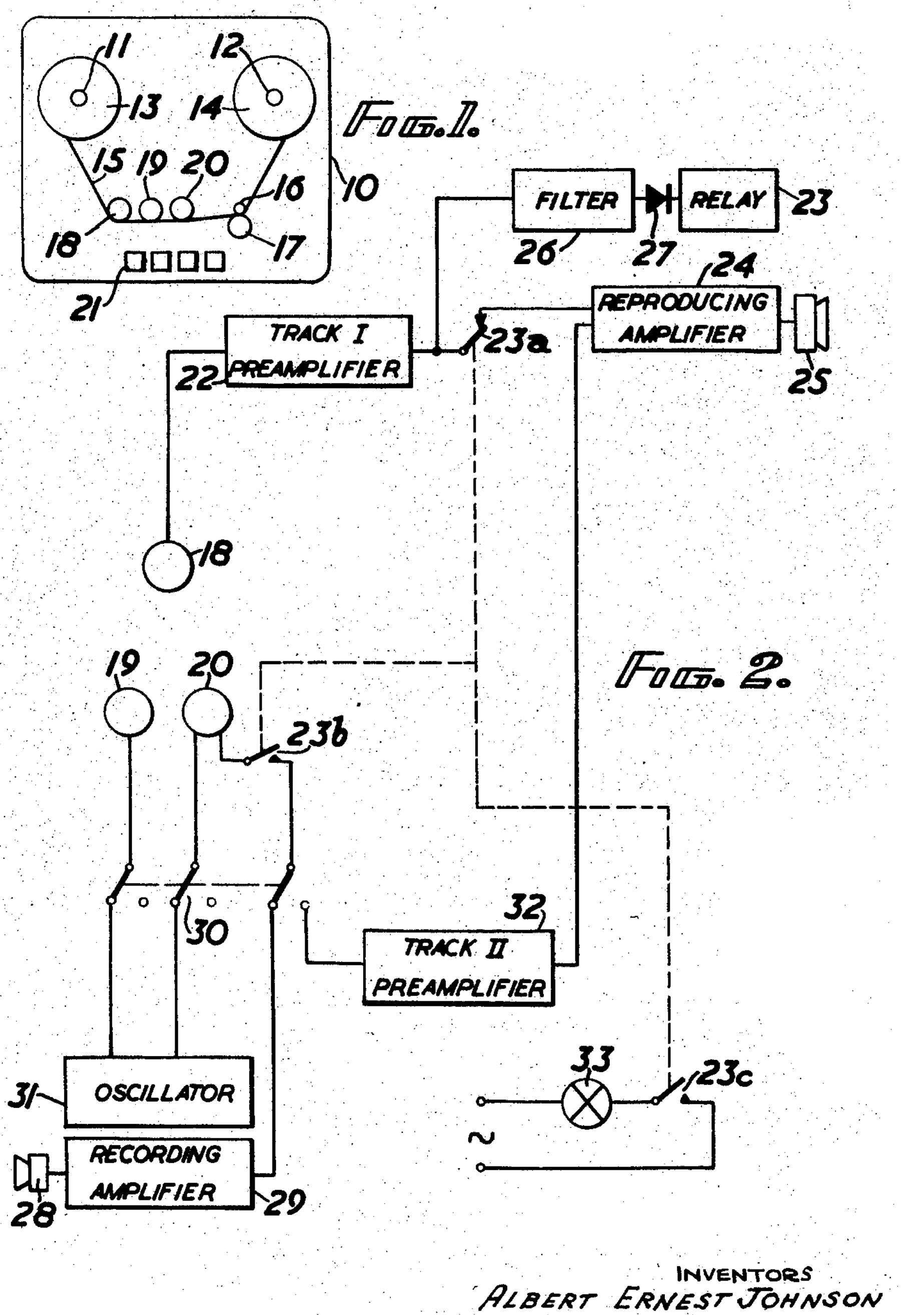

This invention relates to magnetic recording and reproducing apparatus of the type using a tape-like or similar record carrier capable of carrying two record tracks simultaneously. The invention has for its object to provide apparatus which is particularly suitable for educational and instructional purposes.

Magnetic recording and reproducing apparatus of the type specified above is provided in accordance with the present invention with facilities for reproducing from both tracks but for recording on one track only. More specifically, the apparatus has a reproducing head only associated with one track, and a recording and reproducing head (or heads) and an erase head associated with a second track.

In using apparatus in accordance with the invention for say instructional purposes in learning a foreign language a series of model phrases or sentences are recorded upon that one track which can be used with the reproducing head only, an unrecorded gap being left after each recorded passage, of the same duration. A pupil can then record upon the second track an imitation of that which is reproduced from the first track, and can subsequently reproduce his imitation of the original. The recorded imitation can be erased as desired, and the procedure repeated as often as is desired.

In order that the invention may be more fully and clearly understood one embodiment will now be described with reference to the accompanying drawing, in which Figure 1 is a diagrammatic plan view of magnetic tape recording and reproducing apparatus and Figure 2 is a schematic circuit diagram of the apparatus.

Referring first to Figure 1 of the drawing, the apparatus comprises a casing 10 from which two spindles 11 and 12 protrude; these spindles receive a supply spool 13 and take up spool 14 respectively carrying the magnetic tape 15. The tape transport mechanism includes a capstan pulley 16 against which the tape is pressed by a pressure roller 17 and a suitable electric motor or motors are provided. The tape is capable of carrying two record tracks simultaneously, the two tracks being disposed side by side along the length of the tape. For convenience, these tracks will be termed track I and track II. The apparatus is provided with a reproducing head 18 so arranged that it is associated with track I. An erase head 19 and a combined recording and reproducing head 20 are arranged for use with track II. Controls are provided at 21; these include a record/reproduce switch for track II. Facilities for fast forward and reverse transport of the tape can be provided.

It should be explained that the apparatus is intended for use with a tape having already recorded on track I a series of passages (e.g. model phrases or sentences in a foreign language. Each passage is separated from the next in the series by a portion of track I on which a control signal has been recorded. The control signal consists of a predetermined audio frequency signal, say at 1,000 c.p.s. As will be explained hereinafter, the apparatus is provided with control means which respond to the control signal to render means for recording on track II operative. These recording means are inoperative at other times and thus the user can only record his imitations of the model passages during the intervals of time between those passages. The control means also serve to prevent reproduction from track I during those intervals and to cause a signal lamp to be illuminated thereby indicating to the user that the apparatus is available for recording.

Turning now to the schematic diagram of Figure 2, the output from the reproducing head 18 is fed to a track I preamplifier 22, the output from which is supplied via normally closed contacts 23*a* of a relay 23 to a reproducing amplifier 24 and hence to a loudspeaker 25. The relay 23 forms part of the means responding to the recorded control signal and is energised from the output of the pre-amplifier 22 via a band-pass filter 26 and a rectifier 27. The filter 26 has a narrow pass band centered on the frequency of the control signal; the pass band should be of sufficient width to allow for shifting of the control signal frequency due to small variations in tape speed which may occur. The relay 23 is of the slow-operating type, giving a delay of say 0.5 second, so that it will not be energised by short duration portions of the recorded passages at the control frequency.

The means for recording on track II of the tape comprise a microphone 28 and a recording amplifier 29, the output of which is fed via contacts of a three-pole, two-way switch 30 (the record/reproduce switch) of controls 21 and normally-open contacts 23*b* of relay 23 to the record/reproduce head 20. The switch 30 is shown in the record position, in which position it will be noted erase and bias voltages are supplied by an oscillator 31 to the erase head 19 and record-reproduce head 20 respectively. With the switch in the reproduce position, the oscillator 31 is disconnected from the heads 19 and 20 and the record-reproduce head 20 is connected via relay contacts 23*b* and switch contacts to a track II pre-amplifier 32. The output of the pre-amplifier 32 is fed to the reproducing amplifier 24 which is common to both tracks.

It will be seen that track II can only be used for recording or reproduction during such periods as the control signal is being reproduced from track I and that during these periods reproduction from track I is prevented. Normally open contacts 23*c* of relay 23 are included in the energising circuit of a signal lamp 33, which lamp thereby serves to indicate to a user that he can make his imitation recording.

The spools 13 and 14 can be made non-reversible on their spindles 11 and 12 to prevent the danger of a model recording being inadvertently erased.

We claim:

1. A magnetic recording and reproducing apparatus comprising a microphone, a single magnetic record member having thereon a first record track for recording intelligence through said microphone at spatial intervals and a control signal between two recordings of intelligence and a second record track, a speaker, a reproducing head coacting with said first track and a recording and reproducing head coacting with said second track, said reproducing head reproducing the intelligence through said speaker and the interspaced control signal recorded on said first track and said recording and reproducing head respectively recording intelligence imitated by an operator through said microphone from said first track on said second track and reproducing said imitated intelligence from the latter track through said speaker, and control means responsive to said control signal recorded on said first track and controlling said recording and reproducing head coacting with said second track whereby said recording and reproducing head is activated for recording in response to said control signal.

2. An apparatus according to claim 1, wherein said control means further control the recording and reproducing head coacting with said second record track to render the said head inoperative for reproducing while it is activated for recording.

3. An apparatus according to claim 2 and further comprising signal means controlled by said control means, said control means actuating said signal means in response to an activation of said recording and reproducing head.

4. An apparatus according to claim 3 and further comprising erasing means controlled by said control means, said erasing means coacting with said second track for erasing intelligence recorded thereon.

5. A magnetic recording and reproducing apparatus comprising a single magnetic record member, first and second discrete record tracks defined on said record member, said first record track having recorded thereon intelligence at spatial intervals and a control signal of predetermined frequency in the interval between each two intelligence recordings, first reproducing means coacting with said first track for reproducing intelligence recorded thereon, said reproducing means including a preamplifier and a main amplifier connected in circuit, electrically operated recording means coacting with said second track for recording intelligence thereon, second reproducing means coacting with said second track for reproducing intelligence recorded thereon, and control means controlled by the control signals recorded on said first track and controlling the recording means for activating the latter in response to said signals for recording intelligence reproduced from the first track, said control means including a control circuit connected to the output of said preamplifier and including rectifying means and filter means having a pass band embracing the frequency of the control signals, and relay means controlled by the output of said rectifying means, said relay means controlling normally open contacts included in an energizing circuit with said recording means for closing said contacts upon energization of said relay means.

6. An apparatus according to claim 5, wherein said relay means further control normally closed contacts, said latter contacts being included in the circuit connection between the preamplifier and the main amplifier.

7. An apparatus according to claim 5, wherein said second reproducing means and said recording means are connected in circuit by a partly common circuit connection said normally open relay contacts being included in said common circuit connection.

References Cited in the file of this patent

UNITED STATES PATENTS

| | | |
|---|---|---|
| 2,209,157 | Glunt | July 23, 1940 |
| 2,518,117 | Birkes | Aug. 8, 1950 |
| 2,558,853 | Kappeler | July 3, 1951 |
| 2,702,315 | Roderick | Feb. 15, 1955 |
| 2,764,639 | Holt | Sept. 25, 1956 |
| 2,777,901 | Dostert | Jan. 15, 1957 |